United States Patent
Watanabe et al.

(10) Patent No.: US 7,623,832 B2
(45) Date of Patent: Nov. 24, 2009

(54) WIRELESS COMMUNICATION APPARATUS

(75) Inventors: Masamichi Watanabe, Sapporo (JP); Yasushi Kaeriyama, Noboribetsu (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 11/229,688

(22) Filed: Sep. 20, 2005

(65) Prior Publication Data

US 2006/0079189 A1   Apr. 13, 2006

Related U.S. Application Data

(63) Continuation of application No. PCT/JP03/03917, filed on Mar. 28, 2003.

(51) Int. Cl.
H04B 1/38 (2006.01)

(52) U.S. Cl. ............... 455/90.3; 455/575.1; 455/575.4; 455/575.5; 455/575.8

(58) Field of Classification Search ............... 455/90.1, 455/90.3, 97, 550.1, 575, 575.5–575.8, 128, 455/347, 562.1; 343/700 R, 702, 714, 761, 343/763
See application file for complete search history.

(56) References Cited

U.S. PATENT DOCUMENTS

| | | | |
|---|---|---|---|
| 5,204,687 A * | 4/1993 | Elliott et al. | 343/702 |
| 5,517,676 A * | 5/1996 | Sekine et al. | 455/575.5 |
| 5,658,157 A | 8/1997 | Koiwa et al. | |
| 5,990,839 A * | 11/1999 | Schefte et al. | 343/702 |
| 6,052,567 A * | 4/2000 | Ito et al. | 455/575.7 |
| 6,091,972 A * | 7/2000 | Ogasawara | 455/575.7 |
| 6,453,154 B1 * | 9/2002 | Haber et al. | 455/90.1 |
| 6,469,668 B1 * | 10/2002 | Jones et al. | 343/702 |
| 6,618,013 B1 * | 9/2003 | Aldous | 343/702 |
| 6,720,927 B2 * | 4/2004 | Bakker et al. | 343/702 |
| 2003/0083023 A1 * | 5/2003 | Chang et al. | 455/90 |

FOREIGN PATENT DOCUMENTS

| | | |
|---|---|---|
| EP | 0 710 059 | 5/1996 |
| JP | 8-129619 | 5/1996 |
| JP | 3029119 | 7/1996 |
| JP | 3050114 | 4/1998 |
| JP | 11-155003 | 6/1999 |
| JP | 2000-307331 | 11/2000 |
| JP | 2001-57523 | 2/2001 |
| JP | 2003-510870 | 3/2003 |
| JP | 2003-100381 | 4/2003 |

OTHER PUBLICATIONS

Japanese Patent Office Notice of Reasons for Rejection dated Jul. 11, 2006 of Application No. JP 2004-570125.
Notice of Reasons for Rejection dated Oct. 16, 2006.

* cited by examiner

Primary Examiner—Cong Van Tran
(74) Attorney, Agent, or Firm—Staas & Halsey LLP

(57) ABSTRACT

A wireless communication apparatus that provides an electronic apparatus with a wireless communication capability includes a connector connectable to the electronic apparatus, and an antenna section that is movable between a first position that covers said connector, and a second position that exposes said connector.

15 Claims, 17 Drawing Sheets

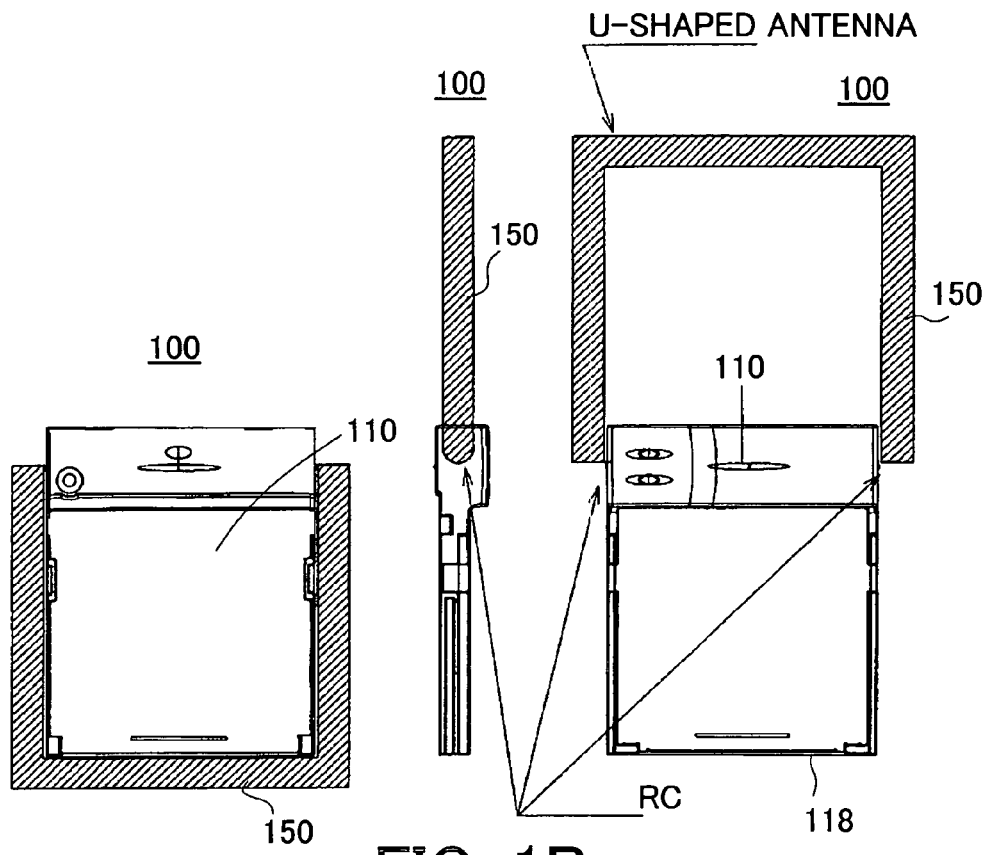
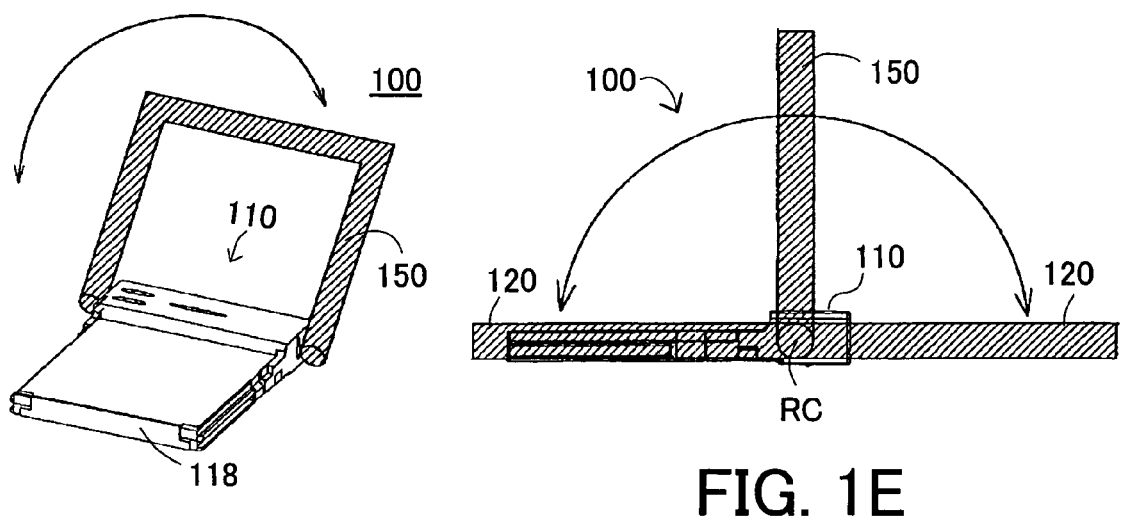
FIG. 1A  FIG. 1B  FIG. 1C
FIG. 1D  FIG. 1E

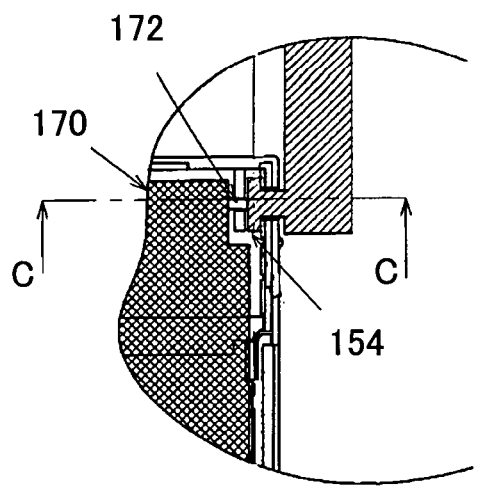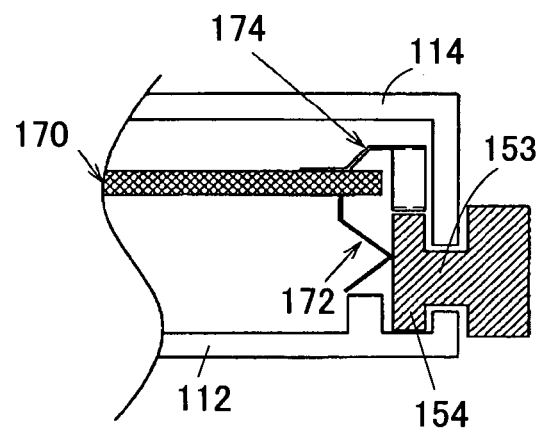
FIG. 5A
FIG. 5B

PRIOR ART

WIRELESS COMMUNICATION APPARATUS

This application is a continuation based on PCT International Application No. PCT/JP2003/003917, filed on Mar. 28, 2003, which is hereby incorporated by reference herein in its entirety as if fully set forth herein.

BACKGROUND OF THE INVENTION

The present invention relates generally to a function expanding apparatus that is connected to an electronic apparatus and expands a function of the electronic apparatus, and more particularly to a wireless communication apparatus having a connector that exposes a connector for connection with the electronic apparatus. The present invention is suitable, for example, for a compact flash ("CF") type wireless communication apparatus.

The recent spreads of the portable information terminals and the wireless communications require further repletion of data communications using portable information terminals, such as a personal digital assistant ("PDA" hereinafter), a personal computer ("PC" hereinafter), and a game machine. In order to meet this requirement, the wireless communication apparatus is required to have high performance and multiple functions as well as being inexpensive.

The Personal Handyphone System ("PHS") is a mainstream in the conventional wireless communication apparatus and the communication network condition is not always good for data communications. Therefore, it is necessary to secure and expand the communication network by using cellular phone and NTT Docomo Wireless Packet Network ("DoPa") communication networks.

The conventional wireless communication apparatus is often inserted into an insertion opening in a housing of the portable information terminal during communications. See, for example, Panasonic, "the World's first memory built-in data card type PHS P-in memory" brochure, Japan Matsushita Electric Industrial, Co., Ltd. This type of wireless communication apparatus 10 typically includes, as shown in FIGS. 15A-15C, an antenna 12 and a case 14. Here, FIGS. 15A to 15C are plane, side and rear views of the conventional wireless communication apparatus 10, respectively. The antenna 12 is attached rotatably to the case 14. While the antenna 12 is folded onto the case 14 in FIGS. 15A-15C, the antenna 12 is unfolded from the case 14 perpendicular to the paper of FIG. 15A when used for communications. The case 14 has, for example, a CF connector 16, which exposes pinholes pursuant to CF Card Slot Type I/Type II, and is engageable with pins provided to the portable information terminal (not shown). The CF card is a small memory card derived from the PC card, and can store data as well as communicating the data.

Since the wireless communication apparatus 10 exposes the connector 16 when disconnected to the portable information terminal, the wireless communication apparatus 10 is inserted into protective cases 20 and 30 shown in FIGS. 16 and 17 for dustproof purposes. Here, FIG. 16 is an exploded perspective view of the protective case 20 and a perspective view for explaining an attachment of the wireless communication apparatus 10 to the protective case 20. FIG. 17 is a perspective view for explaining an attachment of the wireless communication apparatus 10 to the protective case 30. The protective case 20 includes an upper cover 22 and a lower cover 24, and the upper cover 22 is rotatable around the lower cover 24. The protective case 20 accommodates the wireless communication apparatus 10 completely. The protective case 30 accommodates the wireless communication apparatus 10 movably along slide rails 32 and partially (or only around the connector 16). These protective cases are also referred to as a molded case, a soft case, a carrying case, etc.

However, the protective case is an accessory separate from the wireless communication apparatus and needs to be inexpensive. In addition, since the wireless communication apparatus and the protective case are separate members, the protective case is easily left at a communication place or lost.

BRIEF SUMMARY OF THE INVENTION

Accordingly, it is an exemplified general object of the present invention to provide a wireless communication apparatus that protects the connector from the dust relatively inexpensively.

In order to achieve the above objects, a wireless communication apparatus according to one aspect of the present invention that provides an electronic apparatus with a wireless communication capability includes a connector connectable to the electronic apparatus, and an antenna section that is movable between a first position that covers the connector, and a second position that exposes the connector. According to this wireless communication apparatus, the antenna section shields the connector, and the multifunction reduces the cost of the dustproof function.

Preferably, the wireless communication apparatus further includes an angle adjusting mechanism that adjusts and fixes an angle of the antenna section, thereby fixing the antenna section at the predetermined angle and maintaining the predetermined communication performance. For similar reasons, it is preferable that the wireless communication apparatus further includes a length adjusting mechanism that adjusts and fixes a length of the antenna section. At that time, it is preferable that the wireless communication apparatus further includes a stopper mechanism that prevents a drop of the antenna section.

Preferably, the wireless communication apparatus further includes a slide mechanism that slides the antenna section. A combination of the slide and rotation actions can shield the connector without fail.

Preferably, the antenna section is dividable into plural parts, thereby improving the antenna's directivity. At the same time, the plural parts may include first and second parts that are independently rotatable, and the angle adjusting mechanism may fix the first and second parts at different angles. The plural parts may be independently rotatable in at least two directions. At least one of the plural parts may have a bendable end. The antenna section may include an engagement portion that engages the plural parts with each other. Thereby, a separation of the antenna section is prevented in covering the connector.

The electronic apparatus may have an insertion opening and the wireless communication apparatus may be inserted ejectably into the insertion opening, wherein the antenna section may serve to an ejector that is pulled in ejecting the wireless communication apparatus that is inserted into the insertion opening. This configuration can improve the operability of ejecting of the wireless communication apparatus. The antenna section may include a portion that contacts the connector and is made of an elastic material, thereby preventing damages of the connector. The antenna section may include an antenna, and an antenna cover that covers the antenna and has a shape different from that of the antenna. In other words, the antenna cover or both the antenna and the antenna cover have a connector shielding function. The antenna section may have an arbitrary shape, such as a U-shape, a T-shape, an L-shape and an I-shape.

A function expanding apparatus according to another aspect of the present invention that expands a function of an electronic apparatus includes a connector connectable to the electronic apparatus; and a shield that is movable between a first position that covers the connector, and a second position that exposes the connector. The present invention thus is not limited to the wireless communication apparatus, but is broadly applicable to a function expansion apparatus.

Other objects and further features of the present invention will become readily apparent from the following description of the embodiments with reference to accompanying drawings.

BRIEF DESCRIPTION OF THE DRAWINGS

FIGS. 1A to 1E are schematic views of a wireless communication apparatus according to the present invention.

FIGS. 5A and 5B are partially enlarged plane and sectional views of another illustrative arrangement between a board and the antenna section attached to the housing in the wireless communication apparatus shown in FIG. 3.

DETAILED DESCRIPTION OF THE INVENTION

Figure 2A:
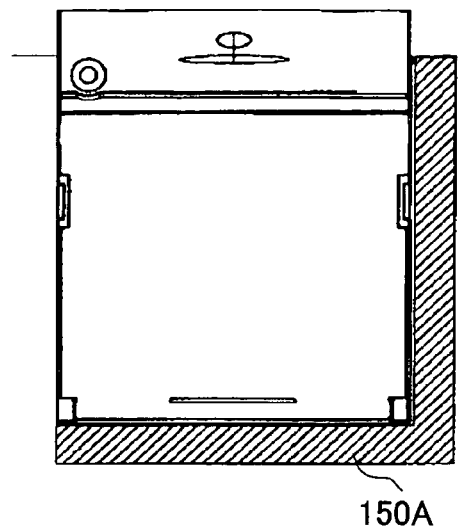
FIGS. 2A to 2D are plane and side views showing various forms of the antenna section shown in FIG. 1.

Referring now to the accompanying drawings, a description will be given of a wireless communication apparatus 100 according to one aspect of the present invention. Here, FIG. 1A is a plane view of the wireless communication apparatus 100 with an antenna section 150 folded. FIG. 1B is a side view of the wireless communication apparatus 100 with the antenna section 150 rotated by 180° and unfolded. FIG. 1C is a plane view of the wireless communication apparatus 100 with the antenna section 150 rotated by 180° and unfolded. FIG. 1D is a perspective view of the wireless communication apparatus 100 in use with the antenna section 150 inclined. FIG. 1E is a transparent side view for explaining movements (or rotations) of the antenna section 150.

The wireless communication apparatus 100 is one illustrative function expanding apparatus that expands a function of an electronic apparatus, such as a PDA, but the inventive function expansion apparatus is not limited to the wireless communication apparatus. While the wireless communication apparatus of this embodiment is a CF wireless communication apparatus that enables the electronic apparatus to conduct a wireless communication, such as a mail communication, a data communication and an access to the Internet, in a communication network, such as a PHS, cellular phone and a NTT Docomo Wireless Packet Network ("DoPa"), the present invention does not prevent the wireless communication apparatus from using an interface other than the CF card interface. In addition, the present invention does not prevent the wireless communication apparatus from serving as a wireless LAN.

The wireless communication apparatus 100 includes, as shown in FIGS. 1A to 1E, a housing 110 and an antenna section 150. The housing 110 installs a CF card, has a CF connector 118. The CF card enables the wireless communication apparatus 100 to store the received and transmitting data. The CF connector 118 has 50 pinholes (not shown) to be engaged with 50 pins provided in the electronic apparatus body. The CF card and CF connector 118 can apply any structure known in the art, and a detailed description thereof will be omitted.

The antenna section 150 has an antenna used to communicate with a base station (not shown), and provides the electronic apparatus with wireless communication capabilities. As shown in FIG. 1A, the antenna section 150 shields the CF connector 118 for dustproof purposes. The antenna section 150 is movable between a position that covers the CF connector 118, and a position that exposes the CF connector 118. More specifically, as shown in FIGS. 1B and 1E, the antenna section 150 is rotatable by 180° (if necessary 360°) around a rotational center RC. Thus, the antenna section 150 also has a dustproof function for the CF connector 118, and is made multifunctional. Therefore, the wireless communication apparatus 100 less expensively provides a dustproof capability than the prior art protective covers 20 and 30, and prevents the loss of the protective covers 20 and 30.

Figure 2B:
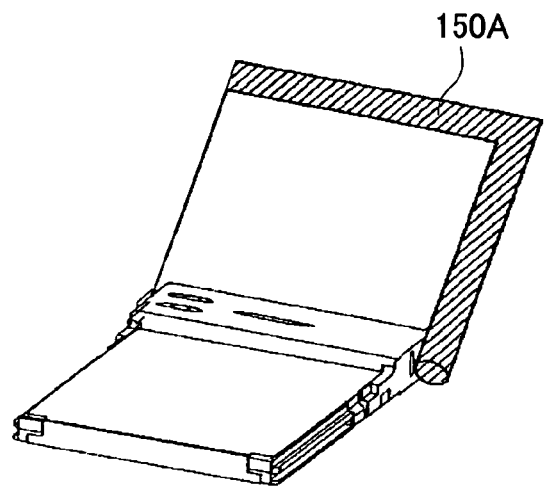
Figure 2C:
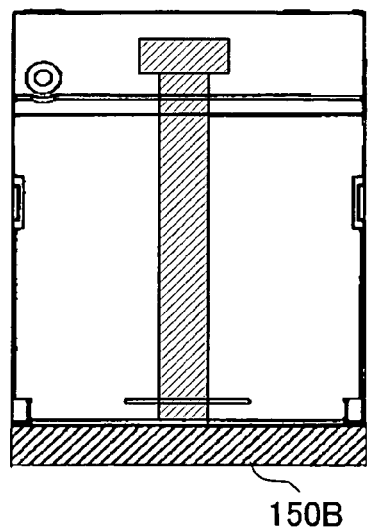
Figure 2D:
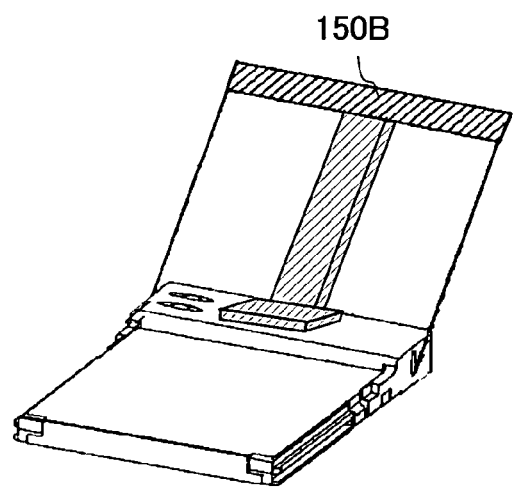

The antenna section 150 in this embodiment illustratively has a U-shape, and but may have another shape. For example, the antenna section 150 may be replaced with a L-shaped antenna section 150A, as shown in FIGS. 2A and 2B. Here, FIG. 2A is a plane view of the folded antenna section 150A as a first variation of the antenna section 150. FIG. 2B is a perspective view of the unfolded antenna section 150A. Alternatively, the antenna section may be replaced with a T-shaped antenna section 150B. Here, FIG. 2C is a plane view of the folded antenna section 150B as a second variation of the antenna section 150. FIG. 2D is a perspective view of the unfolded antenna section 150B. Of course, the antenna section 150 may have other shapes, such as I and II shapes. In the following description, unless otherwise specified, a reference numeral 150 generalizes reference numerals 150A, 150B, etc.

The antenna section 150B has a joint 152 with the housing 110, as shown in FIG. 4, which will be described later. The joint 152 has a cylindrical projection 153 having a small diameter, and an engagement part 154 that is connected, at its tip, to a board 170, which will be described later.

Figure 6:
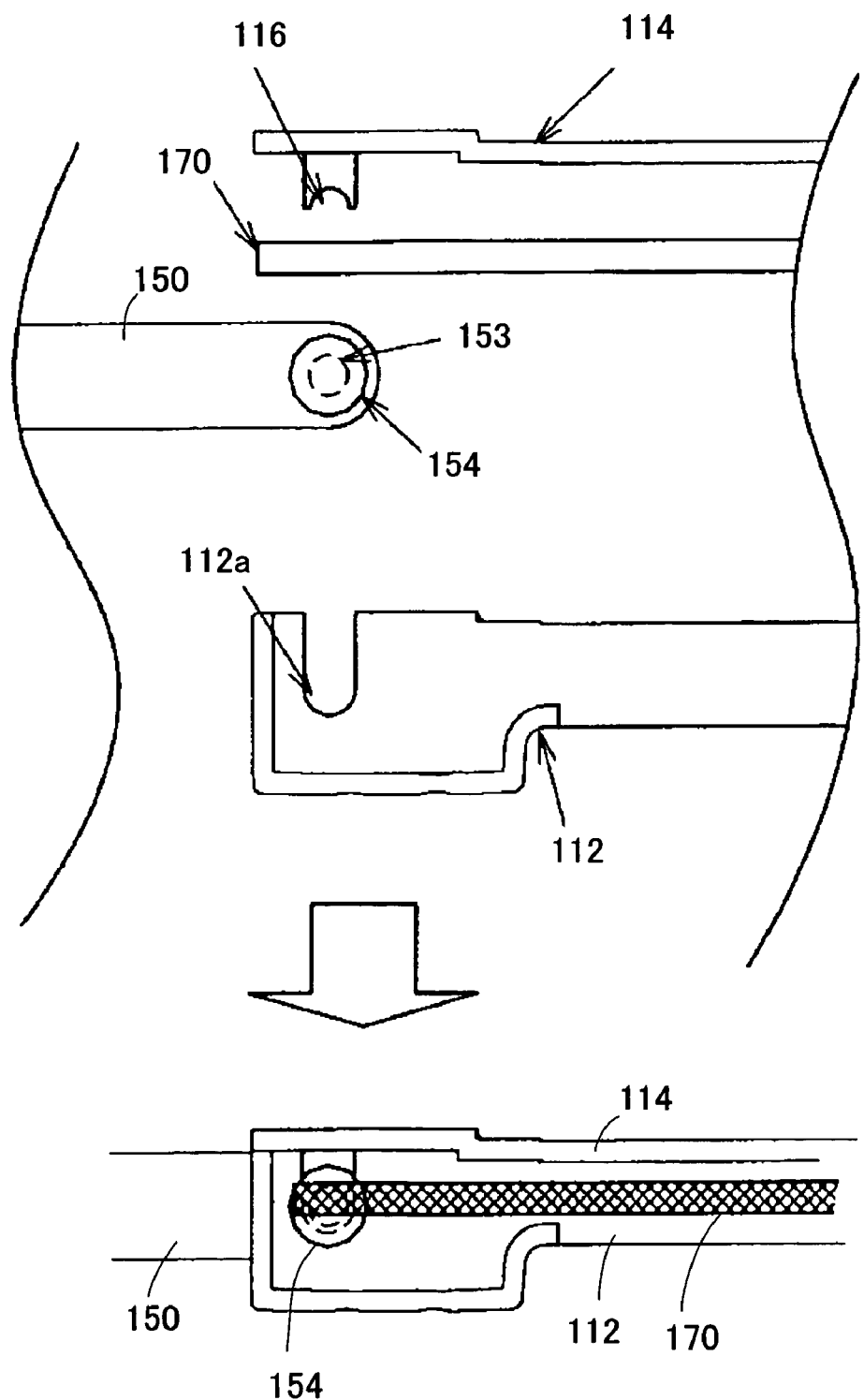
FIG. 6 shows a partially exploded side view of the wireless communication apparatus shown in FIG. 1, and a partially transparent side view of the assembled wireless communication apparatus.

The housing 110 has an upper case 112, and a lower case 114, as shown in FIG. 6, which will be described later, and accommodates the board 170 and supports the antenna section 150 rotatably. Here, an upper diagram in FIG. 6 is an exploded side view of the housing 110, and a lower diagram in FIG. 6 is a transparent side view of the assembly. The upper case 112 has, in its right and left sides as shown in FIGS. 3A to 3I, a pair of grooves 112a into which each projection 153 of the joint 152 is inserted. Referring now to FIGS. 3A-3I, a description will be given of an attachment of the antenna section 150 to the housing 110.

Figures 3A, 3B, 3C, 3D:
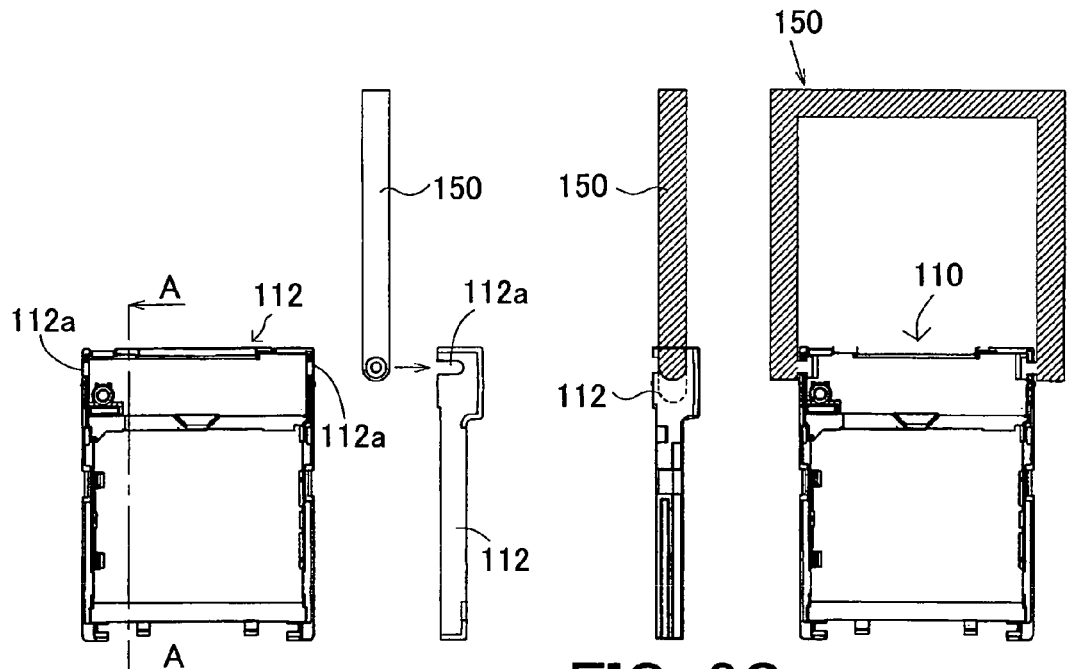
FIGS. 3A to 3G are views for explaining an attachment of the antenna section to a housing in a wireless communication apparatus shown in FIG. 1.

FIG. 3A is a rear view of the upper case 112 to which an upper lid is attached. The upper case 112 has a pair of grooves 112a at both sides so that the bottom of each groove 112a opens. FIG. 3B is a sectional view taken along line A-A in FIG. 3A, showing the attachment of the antenna section 150. The joint 152 of the antenna section 150 is inserted into the upper case 112 from the bottom of the upper case 112. FIG. 3C is a side view of the wireless communication apparatus 100 to which the antenna section 150 is attached. FIG. 3D is a plane view of the wireless communication apparatus 100 in which the antenna section 150 is attached to the housing 110 shown in FIG. 3A.

The antenna section 150 has an extra length that does not overlap the connector 118 of the housing 110 so that the antenna section 150 rotates to and cover the connector 118 without colliding with the housing 110. When the antenna section 150 does not have the extra length, the alternative embodiment makes a surface of the antenna section 150 of an elastic material, such as rubber, and engages the antenna section 150 with the connector 118. Thereby, the antenna 150 can cover the connector 118 without fail. A further alternative embodiment forms the groove 112a in the longitudinal direction of FIG. 3B. Thereby, in covering the connector 118 using the antenna section 150 as shown in FIG. 1A, the antenna section 150 is rotated and moved down as shown by a broken line in FIG. 3C. The antenna section 150 is forced by a spring (not shown) in an upper direction in FIG. 3C; the antenna section 150 is forced in a direction covering the connector 118 when located above the connector 118 and the user releases his hand. A combination of the slide mechanism and the rotating mechanism enables the antenna section 150 to cover the connector 118 without fail.

Figure 4A:
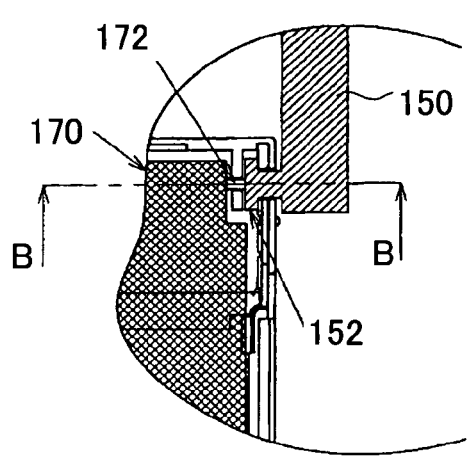
FIGS. 4A and 4B are partially enlarged plane and sectional views of one illustrative arrangement between a board and the antenna section attached to the housing in the wireless communication apparatus shown in FIG. 3.
Figure 4B:
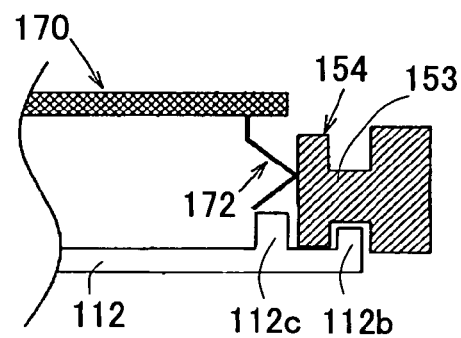

FIG. 4A is a partial enlarged view of one embodiment of the joint 152 in the antenna section 150 shown in FIG. 3D. FIG. 4B is a sectional view taken along a line B-B in FIG. 4A. In this embodiment, a compression spring 172 attached to the top surface end of the board 170 contacts the engagement part 154 and applies an elastic force to the engagement part 154. The engagement part 154 is located between the side 112b and a diaphragm 112c in the upper case 112. The side 112b defines the groove 112a, and the projection 153 of the joint 152 is located on the side 112b. The engagement section 154 is made of metal, and the spring 172 secures continuity between the board 170 and the engagement part 154.

FIG. 5A is a partial enlarged view of another embodiment of the joint 152 in the antenna section 150 shown in FIG. 3D. FIG. 5B is a sectional view taken along a line C-C in FIG. 5A. In this embodiment, the compression spring 172 attached to the top surface end of the board 170 and a compression spring 174 attached to a bottom surface end contact the engagement part 154 and apply elastic forces to the engagement part 154. The engagement part 154 is located between the side surface 112b and a diaphragm 112c in the upper case 112. The side surface 112b defines the groove 112a, and the projection 153 of the joint 152 is located. The engagement section 154 is made of metal, and the springs 172 and 174 secure continuity between the board 170 and the engagement part 154.

Figures 3E, 3F, 3G:
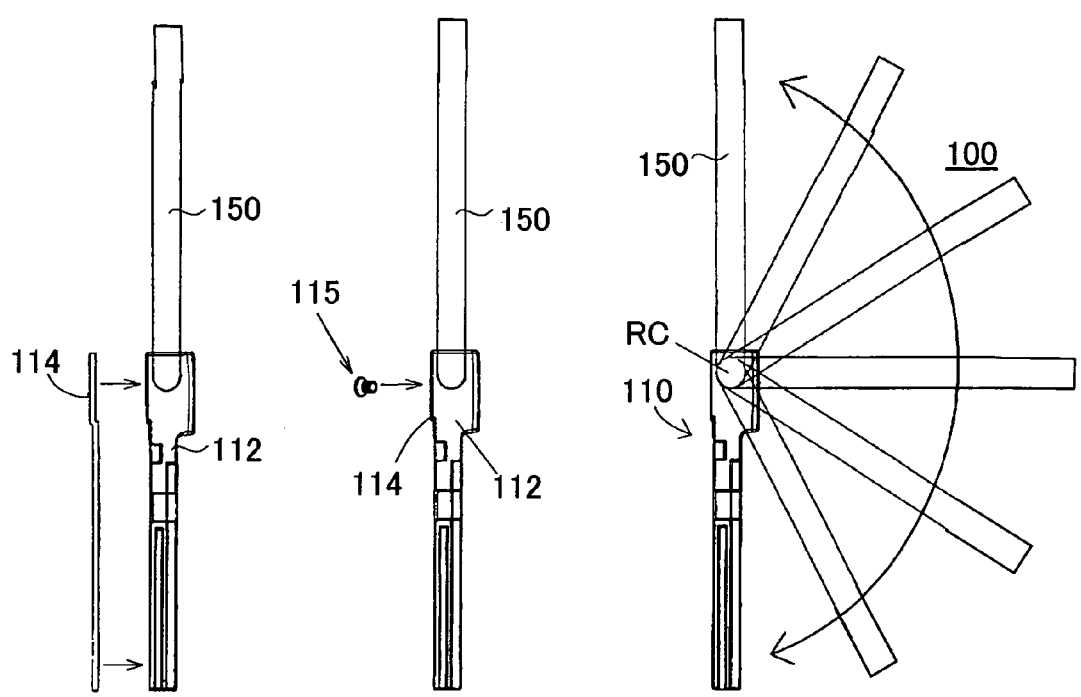

FIG. 3E is a side view showing that the lower case 114 is attached to the upper case 112 from the state in FIG. 3C. The lowercase 114 closes the opening of the grooves 112a. FIG. 3F is a side view showing that a screw 115 fixes the lower case 114 onto the upper case 112 after the lowercase 114 is attached to the uppercase 112. FIG. 3E omits an antenna bearing 116 of the lower case 114 for convenience. FIG. 3G is a side view of the wireless communication apparatus 100 after the attachment of the antenna section 150 ends. As shown in FIG. 3G, the antenna section 150 can rotates around the rotational center RC by 180° (if necessary 360°) in the arrow direction.

The above method for fixing the antenna is a mere example, and the present invention can use any method known in the art, such as screwing, in addition to holding using the case 112.

Referring now to FIGS. 6 and 7, a description will be given of an angle adjusting mechanism 120 for the antenna section 150. The angle adjusting mechanism 120 fixes an angle or rotational position of the antenna section 150 relative to the housing 110, and serves to maintain stable communications. As discussed above, the antenna 150 is assembled as shown in FIG. 6.

Figure 7A:
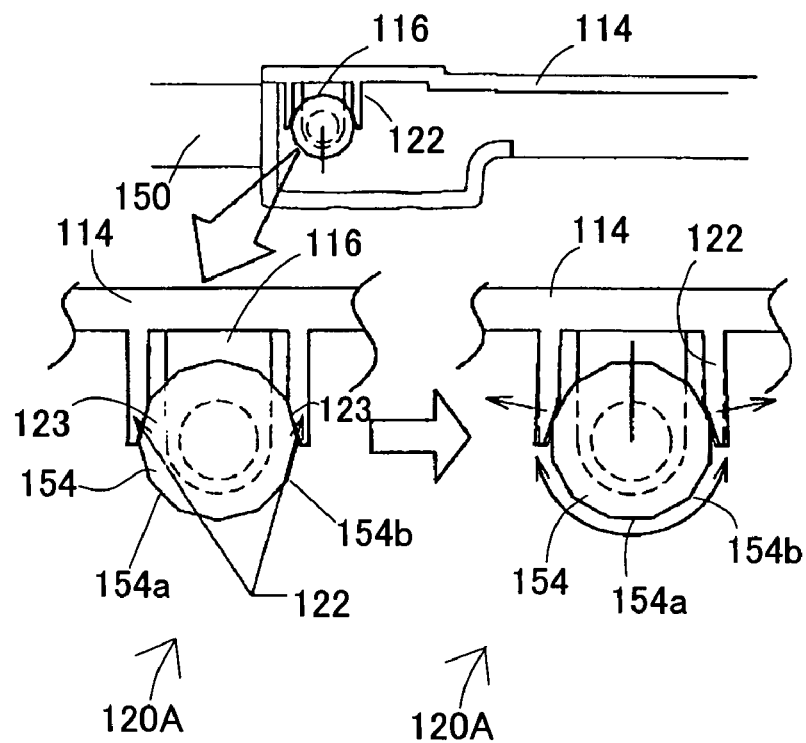
FIGS. 7A and 7B are sectional views for explaining an angle adjusting mechanism of the antenna section in the wireless communication apparatus shown in FIG. 1.

FIG. 7A shows an angle adjusting mechanism 120A as a first embodiment of the angle adjusting mechanism 120. The angle adjusting mechanism 120A utilizes a pair of case springs 122 provided to the lower case 114, and a polygonal shape of the engagement part 154.

The case springs 122 serve as a flat spring, and apply an elastic force to the engagement part 154. This elastic force is used to hold the engagement part 154 at a certain rotational position. The strength of the elastic force is set from the weight and frictional force of the antenna section 150. While this embodiment provides two case springs 122, the present invention does not limit the number of springs and their locations. The case spring 122 is formed, for example, by molding.

The polygonal shape has plural sides 154a and corners 154b. In the lower left diagram in FIG. 7A, which is a partial enlarged view of the top diagram, the case springs 122 have holders 123 that hold two sides 154a. The holder 123 has a plane parallel to the side 154a that reaches the holding position. In other words, each holder 123 faces the engagement part 154, and the left and right case springs 122 have different shapes. As discussed above, the case springs 122 apply a proper elastic force to the two sides 154a of the engagement part 154, and thus the antenna section 150 can be fixed, for example, at the position shown in FIG. 1D.

The elastic force applied by the case springs 122 is set such that the user can change a rotational position of the antenna section 150. Therefore, when the user changes the rotational position of the antenna section 150 and the engagement part 154 rotates, the corners 154b push up the case springs 122 as shown in the lower right diagram in FIG. 7A (in arrow directions). When the engagement part 154 stops at the predetermined rotational position, the case springs 122 fix corresponding sides 154a as shown in the lower left diagram in FIG. 7A. While the polygonal shape is a dodecagon in this embodiment, the present invention is not limited to this shape. As the number of sides (or resolution) of the polygonal shape increases, an angular interval at which the antenna section 150 is fixed becomes acute.

Figure 7B:
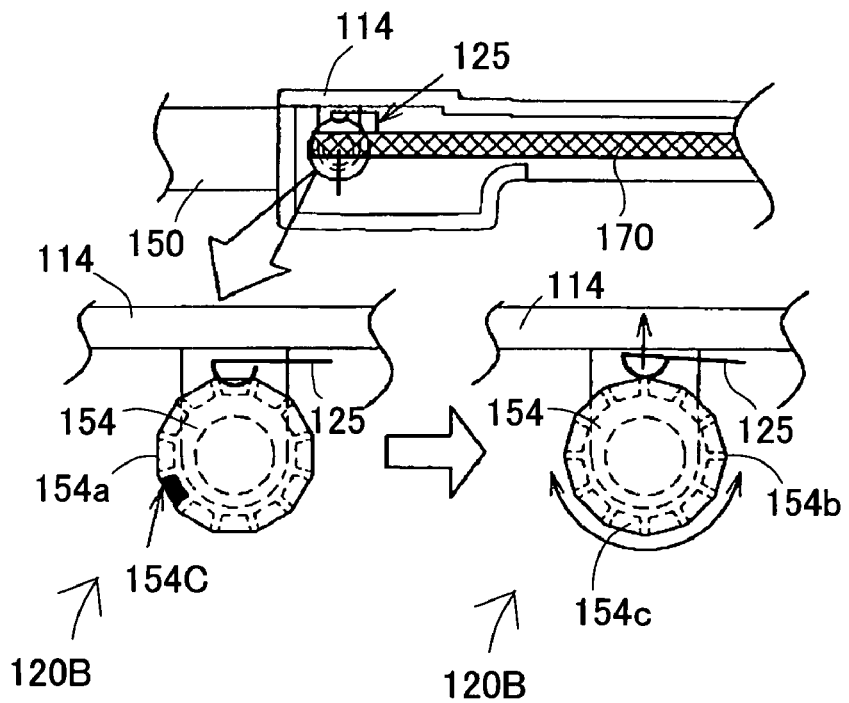

FIG. 7B shows an angle adjusting mechanism 120B as a second embodiment of the angle adjusting mechanism 120. The angular adjusting mechanism 120B utilizes a spring 125 fixed to the housing 110 by a proper fixing means, and a concave 154c formed in each side a polygonal engagement part 154.

The spring 125 is a compression spring that is engaged with the concave 154c formed in each side 154a of the engagement part 154 and applies an elastic force to the engagement part 154. This elastic force is used to hold the engagement part 154 at a certain rotational position. The strength of the elastic force is set from the weight and frictional force of the antenna section 150, and a depth of the concave 154c. While this embodiment provides one spring 125, the present invention does not limit the number and location. When the spring 125 is provided on the board 170, the spring 125 maintains the continuity between the board 170 and the antenna section 150.

The engagement part 154 has plural concaves or dimples 154c at respective sides 154a in addition to the above sides 154a and corners 154b. As long as the spring 125 can be engaged with the engagement part 154, the engagement part 154 may have a cylindrical shape instead of the polygonal shape. As discussed above, since the spring 125 applies a proper elastic force to the concave 154c in the side 154a of the engagement part 154, the antenna section 150 can be fixed, for example, at the position shown in FIG. 1D.

The elastic force applied by the spring 125 is set such that the user can change a rotational position of the antenna section 150. Therefore, when the user changes the rotational position of the antenna section 150 and the engagement part 154 rotates, the corners 154b push up the springs 125 as shown in the lower right diagram in FIG. 7B (in an arrow direction). When the engagement part 154 stops at the predetermined rotational position, the spring 125 fixes the corresponding side 154a as shown in the lower left diagram in FIG. 7B. While the polygonal shape is a dodecagon in this embodiment, the present invention is not limited to this shape. As the resolution of the concaves 154c increases, an angular interval at which the antenna section 150 is fixed becomes finer.

In the following description, unless otherwise specified, the reference numeral 120 generalizes the reference numerals 120A and 120B. The angle adjusting mechanism 120 can fix the antenna section 150 during communications, and improves the communication quality and thereby product quality. Instead of using the angle adjusting mechanism 120 of this embodiment, the wireless communication apparatus 100 may apply any structure known in the art, such as a hinge mechanism used for a laptop PC.

Figure 8:
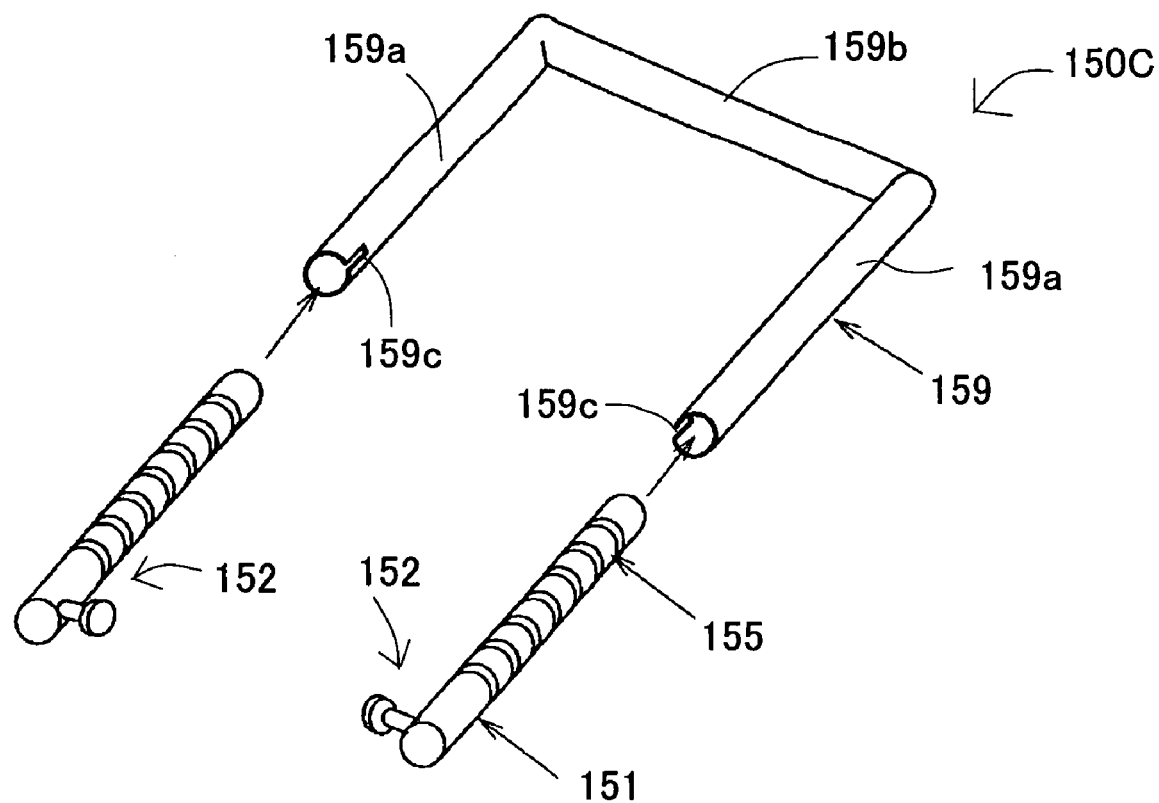
FIG. 8 is an exploded perspective view of the antenna section that is incapable of expansion and contraction in the wireless communication apparatus shown in FIG. 1.

Referring now to FIGS. 8 to 10, a description will be given of the internal structure of the antenna section 150. The antenna section 150 is a helical antenna, and may be capable or incapable of expansion and contraction.

FIG. 8 is an exploded perspective view of an antenna section 150 that is applicable to the antenna section 150 and is incapable of expansion and contraction. The antenna section 150C includes a pair of antenna built-in portions 151 and an antenna cover 159, and the antenna built-in portion 151 has a coil portion 155. While each antenna built-in portion 151 in this embodiment houses an antenna, only one of the antenna built-in portions 151 may house the antenna or these antenna built-in portions 151 may house the antennas of different lengths. The antenna cover 159 has a pair of perpendicular portion 159a and a horizontal portion 159b. Each perpendicular portion 159a has a notch 159c, and each joint 152 is inserted into the notch 159c. The horizontal portion 159b may be hollow, but accommodates a metal rod. The antenna built-in portion 151 may extend through the horizontal portion 159b. The antenna cover 159 may be made of an elastic material, such as rubber, so as not to damage the connector 118. In assembly, the joints 152 are engaged with and bonded to the notches 159c in the perpendicular portions 159a using the adhesive.

Figure 9A:
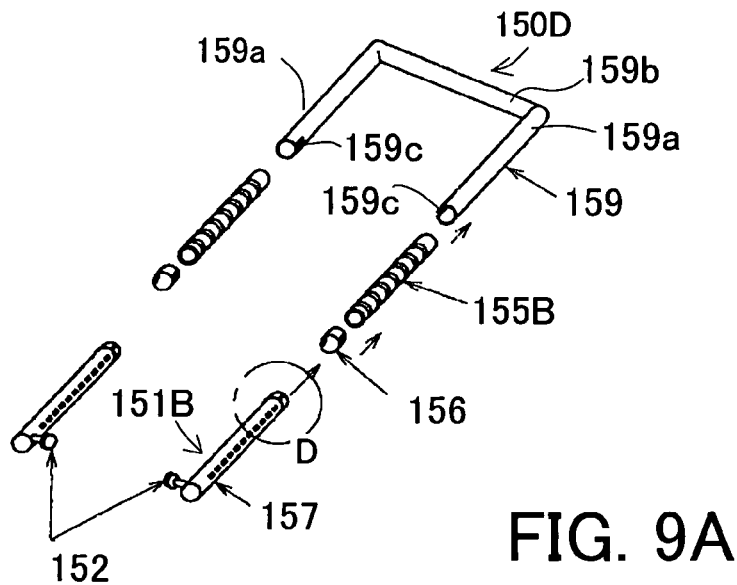
FIGS. 9A to 9C are exploded perspective views of the antenna section that is not capable of expansion and contraction in the wireless communication apparatus shown in FIG. 1.
Figure 9B:
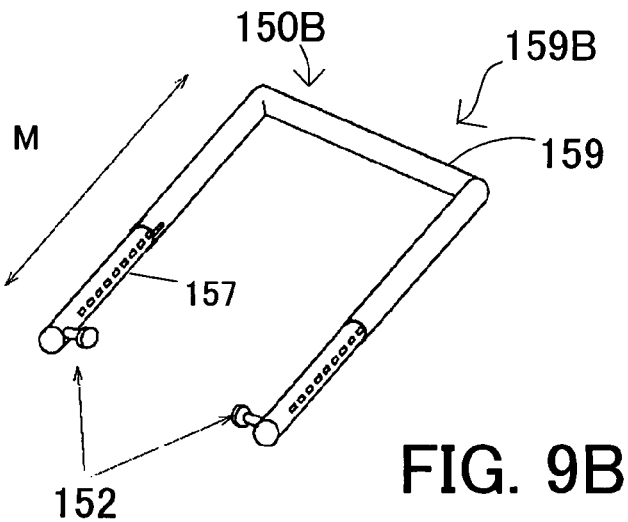
Figure 9C:
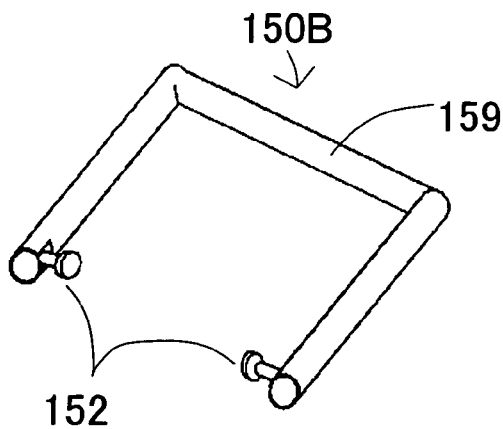

Referring now to FIG. 9, a description will be given of an antenna section 150D that is applicable to the antenna section 150 and capable of expansion and contraction. Here, FIG. 9A is an exploded perspective view of the antenna section 150D. FIG. 9B is a perspective view of the antenna section 150D that is expanded after assembled. FIG. 9C is a perspective view of the antenna section 150D that is not expanded after assembled, similar to the assembled state of the antenna 150C shown in FIG. 8.

The antenna section 150D includes, as shown in FIG. 9A, a pair of antenna built-in portions 151B, a pair of positioning caps 156, a pair of coil portions 155B, and an antenna cover 159.

While each antenna built-in portion 151B in this embodiment houses an antenna, only one of the antenna built-in portions 151B may house the antenna or these antenna built-in portions 151B may house the antennas of different lengths. The antenna built-in portion 151B is different from the antenna built-in portion 151 in that the antenna built-in portion 151B has a slide portion 157. The slide portion 157 has plural aligned concaves 157b. While the antenna built-in portion 151B has an approximately cylindrical shape in this embodiment, the slide portion 157 may have a flat shape, a square pole shape and another shape. The concaves 157b are also formed in the backside of the antenna built-in portion 151B. A relationship between the positioning cap 156 and the slide portion 157 corresponds to a relationship between the spring 125 and the concave 154c, which are described with reference to FIG. 7B. The positioning cap 156 houses a fixing member (or a spring 156a) as described later.

Figure 10A:
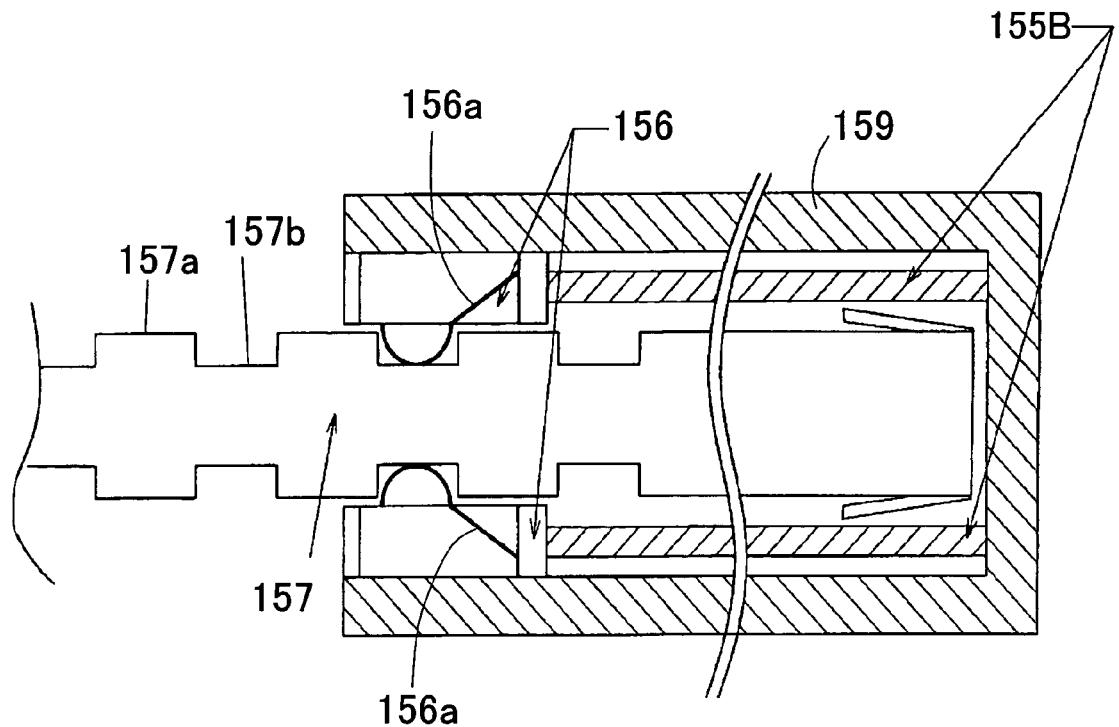
FIGS. 10A and 10B are sectional views for explaining the expansion and contraction and the fixed length of the antenna section shown in FIG. 9 in detail.
Figure 10B:
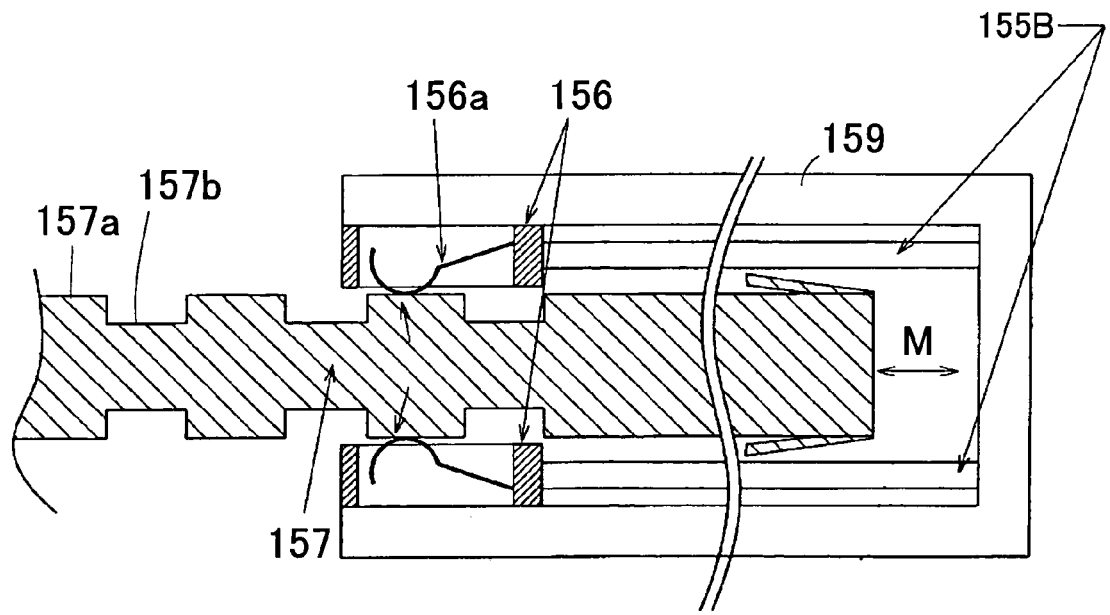

The length of the antenna section 150D is adjustable in a direction M in FIG. 9B. Referring now to FIGS. 10A and 10B, a description will be given of the expansion and fixture of the antenna section 150D at a certain length. Here, FIGS. 10A and 10B are sectional views for explaining in detail the expansion and fixture of the antenna section 150D at a certain length.

As shown in FIGS. 10A and 10B, the positioning cap 156 and coil portion 155B are fixed in the antenna cover 159. The slide portion 157 in the antenna built-in portion 151B moves in the positioning cap 156. The positioning cap 156 has a hollow cylindrical shape, and a pair of springs 156a. Each spring 156a is engageable with the concave 157b in the slide portion 157. FIG. 10A shows that the springs 156a are engaged with the concaves 157b, and FIG. 10B shows a movement of the slide portion 157.

A length fixing mechanism that fixes the length of the antenna section 150D utilizes the springs 156a fixed to the antenna cover 159 and concaves 157b in the slide portion 157. The spring 156a is a compression spring that is engaged with the concave 157b and applies an elastic force to the slide portion 157. This elastic force is used to hold the slide portion 157 or the antenna built-in portion 151B at a certain length. The strength of the elastic force is set from the weight and frictional force of the antenna section 150D above the spring 156a, and the depth of the concave 157. While this embodiment provides two springs 156a, the present invention does not limit the number and location. Since the springs 156a apply proper elastic forces to the concaves 157b in the slide portion 157 as discussed above, the antenna section 150D can be fixed, for example, at a position shown in FIG. 9B.

The elastic force applied by the spring 156a is set such that the user can change the length of the antenna section 150D. Therefore, when the user changes the length of the antenna section 150D and expands and contracts the antenna cover 159 in the direction M in FIG. 9B, the concave 157a between two adjacent concaves 157b of the slide portion 157 pushes up the spring 156a to the outside (or in arrow directions) as shown in FIG. 10B. When the spring 156a is engaged with the concave 157b at the predetermined length position, the springs 156a fix a position of the antenna cover 159 (or the length of the antenna section 50D) via the corresponding convexes 157b as shown in FIG. 10A. As the resolution of the concaves 157b increase, a length interval at which the antenna section 150D is fixed becomes finer.

In the following description, unless otherwise specified, the reference numeral 150 generalizes the reference numerals 150A, 150B, etc. When the length of the antenna section 150A is made incapable of expansion and contraction as shown in FIG. 8, the antenna's length is fixed to the length to cover the connector 118. As a result, the antenna section 150A does not provide the desired communication performance, and restricts the degree of freedom of design. The length adjusting mechanism of this embodiment fixes the antenna section 150 during communications, and improves the communication quality and thereby product quality. While this embodiment elongates the antenna section 150D during communications and minimizes its length when protecting the connector 118 as shown in FIG. 9C, the length may be expanded in shielding the connector 118 and shortened during communications.

Figure 11A:
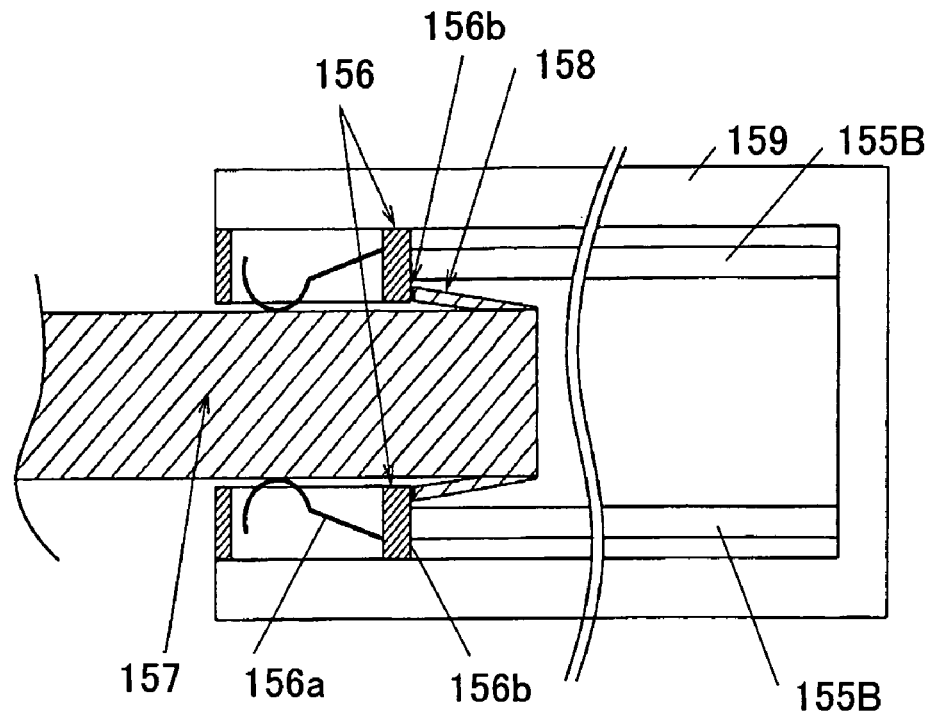
FIGS. 11A and 11B are sectional views for explaining a stopper mechanism according to one embodiment of the antenna section shown in FIG. 9.
Figure 11B:
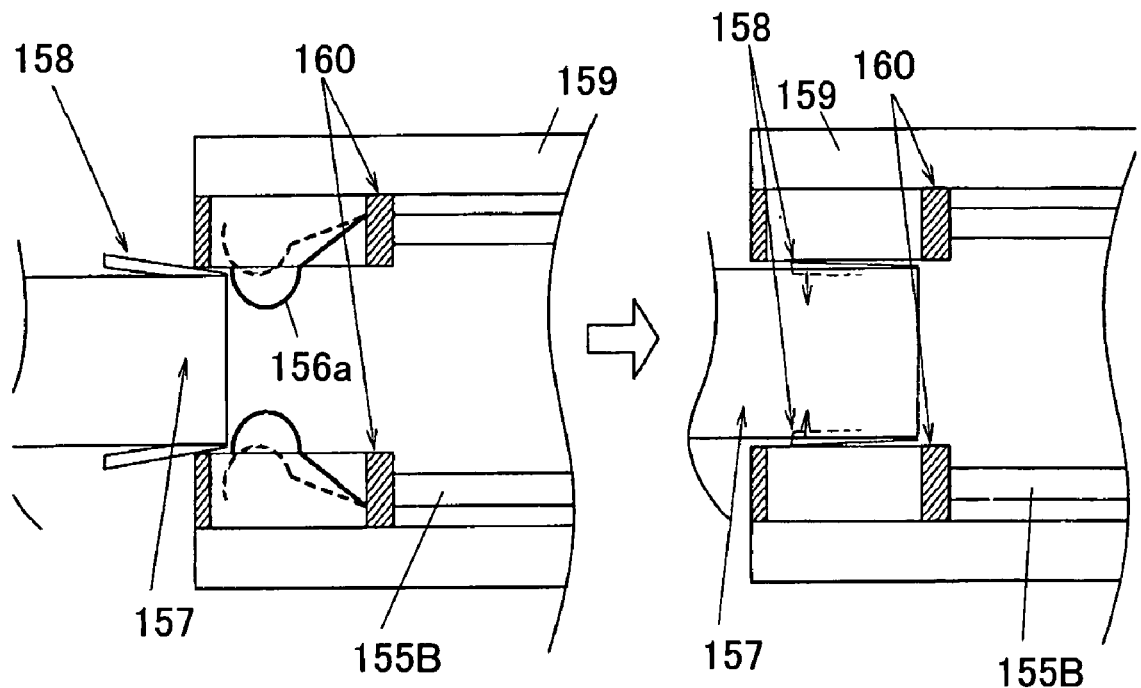
Figure 12A:
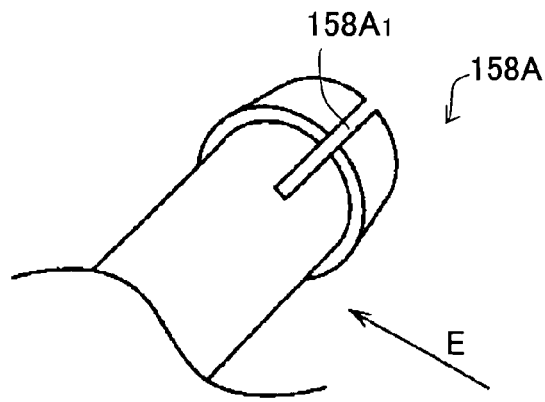
FIGS. 12A, 12B and 12C are sectional views for explaining a stopper mechanism according to another embodiment of the antenna section shown in FIG. 9.
Figure 12B:
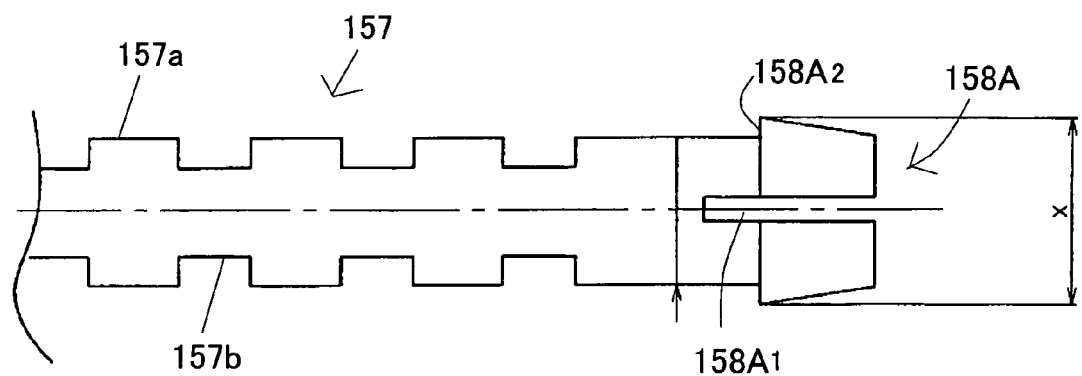
Figure 12C:
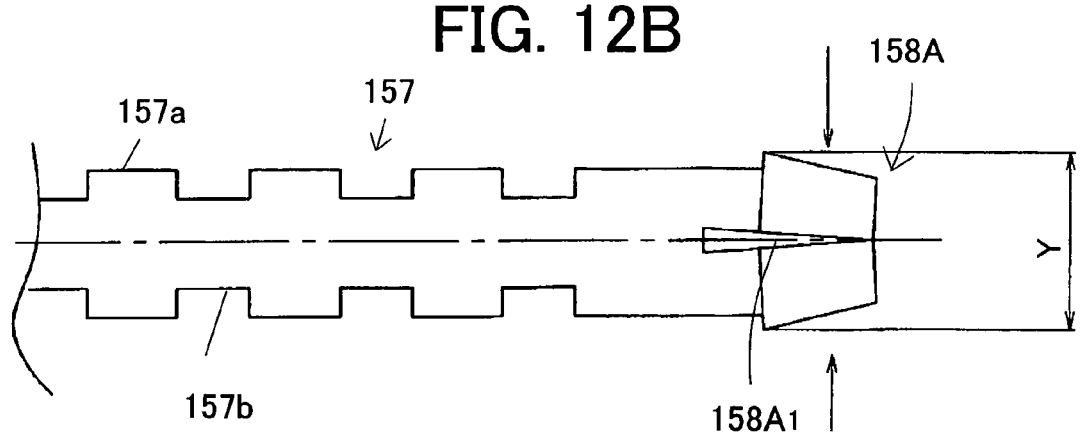

Referring now to FIGS. 11A-11B and 12A-12C, a description will be given of a stopper mechanism of the antenna section 150D. FIGS. 11A and 11B are sectional views of a stopper part 158 according to one embodiment, and FIGS. 12A-12C are sectional views of a stopper part 158A according to another embodiment. The stopper parts 158 and 158A serve to prevent the antenna built-in portion 151 from dropping from the antenna cover 159 when the length of the antenna section 150 is maximized.

FIG. 11A is a sectional view for explaining a function of the stopper part 158 after the stopper part 158 is inserted into the coil portion 155B. FIG. 11B is a sectional view for explaining an action to insert the stopper part 158 into the coil portion 155B.

The stopper part 158 can project from and retreats into the slide portion 157. The stopper part 158 includes, for example, a compression spring (not shown) provided in the slide portion 157, and an engagement part (such as an approximately square pole made of metal) that is engageable with a bracket 156 of the positioning cap 156. In order to load the stopper part 158 into the coil portion 155B, a user presses the antenna cover 159 in the left direction against the spring forces of the springs 156a and deforms the spring 156a as shown by a broken line in the left diagram in FIG. 11B. The engagement parts of the stopper part 158 retreat in the arrow directions into the slide portion 157 against the compression spring (not shown) as shown in the right diagram in FIG. 11B. The stopper part 158 is located in the coil portion 155B when the user further moves the antenna cover 159 in the left direction against the spring force of the spring 156a.

FIG. 11A shows that the loaded stopper part 158 prevents the antenna cover 159 from dropping out of the slide portion 157. The end of the stopper part 158 contacts the bracket 156b of the positioning cap 156, and the stopper part 158 is configured to spread as the antenna cover 159 moves relative to the slide portion 157 in the right direction. As a result, the antenna cover 159 is prevented from being separated from the slide portion 157. Optionally, in order to separate the antenna cover 159 from the slide portion 157 for maintenance purposes, there may be provided a button and other mechanism that retreats the stopper part 158 inside the slide portion 157.

FIG. 12A is an enlarged perspective view of the stopper part 158A applicable to a part D in FIG. 9A. FIG. 12B is a side view of the stopper part 158A viewed from a direction E in FIG. 12A. FIG. 12C is a side view for explaining an insertion of the stopper part 158A into the coil portion 155B.

The stopper part 158A of this embodiment has a truncated cone shape and a pair of notches $158A_1$ symmetrically. As a result, the stopper part 158A can deform as shown in FIGS. 12B and 12C, satisfying a relationship $Y<X1<X$, where X is a diameter before deformation, Y is a diameter after deformation, and X1 is a diameter of a hole of the hollow positioning cap 156.

In order to insert the stopper part 158A into the coil portion 155B, a user presses, similar to FIG. 11B, the antenna cover 159 in the left direction against the spring force of the spring 156a, and deforms the spring 156a as shown by a broken line. At that time, the stopper part 158A deforms and decreases its diameter from X to Y as shown in FIG. 12C so that the notches $158A_1$ narrow. The stopper part 158A is loaded into the coil portion 155B as the user further moves the antenna cover 159 against the spring force of the spring 156a in the left direction.

The stopper part 158A when loaded in the coil portion 155B returns to the state shown in FIG. 12B. As a result, a projecting portion $158A_2$ of the stopper part 158A shown in FIG. 12B contacts the bracket 156B of the positioning cap 156 shown in FIG. 11A, and prevents the antenna cover 159 from further moving relative to the slide portion 157 in the right direction. As a result, the antenna cover 159 can prevent the slide portion 157 from separating from the slide portion 157. Optionally, in order to separate the antenna cover 159 from the slide portion 157 for maintenance purposes, there may be provided a button and other mechanism that turns the stopper part 158A to the state shown in FIG. 12C.

Figure 13:
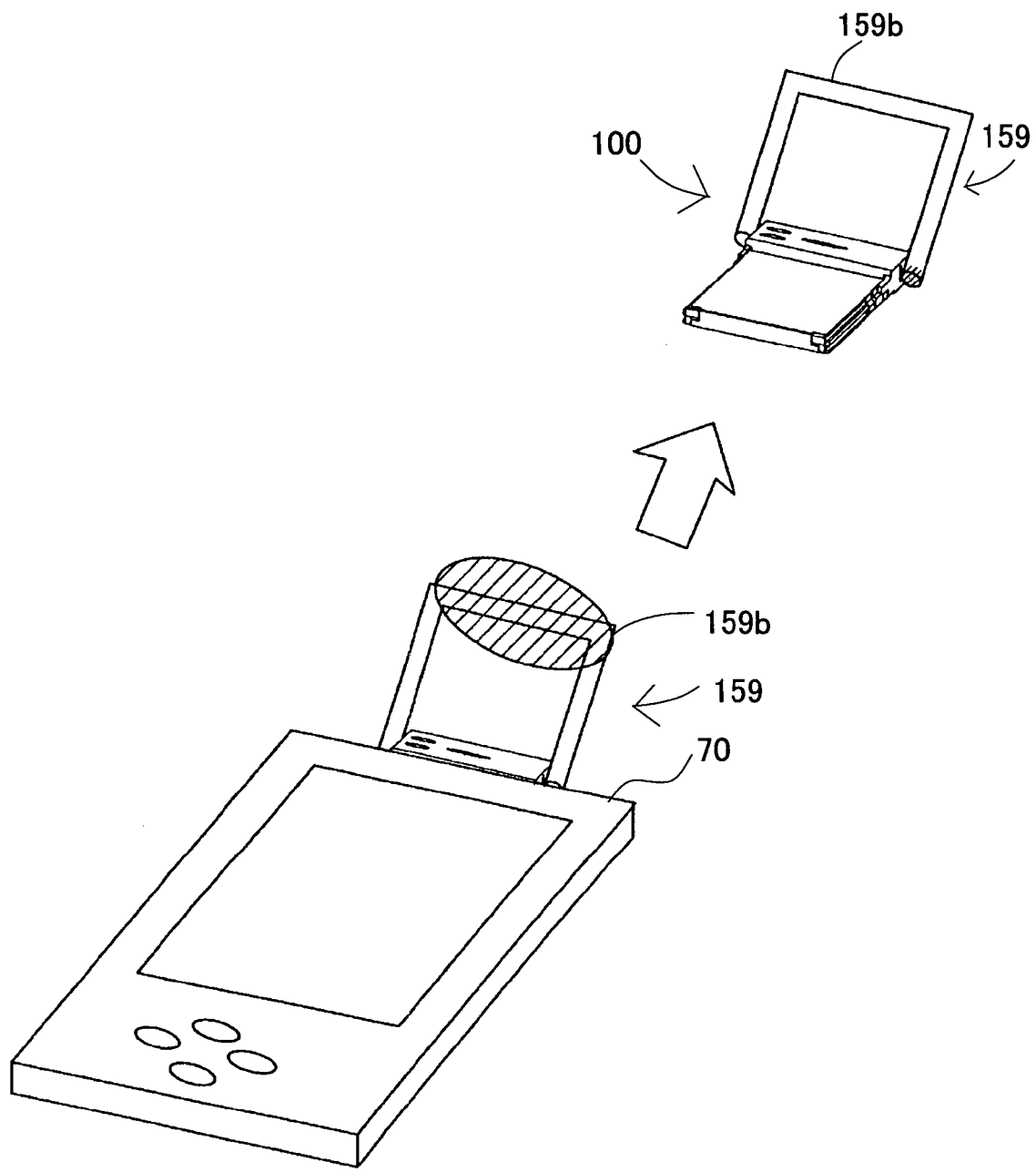
FIG. 13 is a schematic perspective view for explaining another function of an antenna cover of the antenna section shown in FIG. 1.

Referring now to FIG. 13, a description will be given of another function of the antenna cover 159. Here, FIG. 13 is a schematic perspective view for explaining the other function of the antenna cover 159. The antenna cover 159 of this embodiment serves to eject the wireless communication apparatus 100 from an electronic apparatus 70, such as a PDA.

The conventional PDA can be classified into a type that has, at the PDA body, an eject mechanism to detach the wireless communication apparatus (such as an eject button, and a push-push mechanism that installs the wireless communication apparatus in the PDA by one push of the wireless communication apparatus into the PDA, and partially projects the wireless communication apparatus out of the PDA by another push of the wireless communication apparatus), and a type that has no eject mechanism. The latter type that has no eject mechanism often uses a mechanism that does not completely insert the wireless communication apparatus in the body and pulls out the exposed wireless communication apparatus. However, such a partial exposure mechanism has bad operability since the partially exposed wireless communication apparatus is short and thus hard to grip. Therefore, an easy insertion and ejection of the wireless communication apparatus has been conventionally demanded.

This embodiment allows the antenna cover 159 of the antenna section 150 to serve as a pullout grip, as shown in FIG. 13, improving the pullout operability. However, a repetition of this action may apply the load to the joint 152 with the board 170. On the other hand, this embodiment uses an integral structure for the joint 152 as a rotating projection, lowering the load to the antenna section 150. The contact between the joint 152 and the board 170 secures a stroke and a range by using a spring 172 etc., and absorbs the backlash. This structure facilitates the insertion and ejection of the wireless communication apparatus 100, and improves the operability.

Figure 14A:
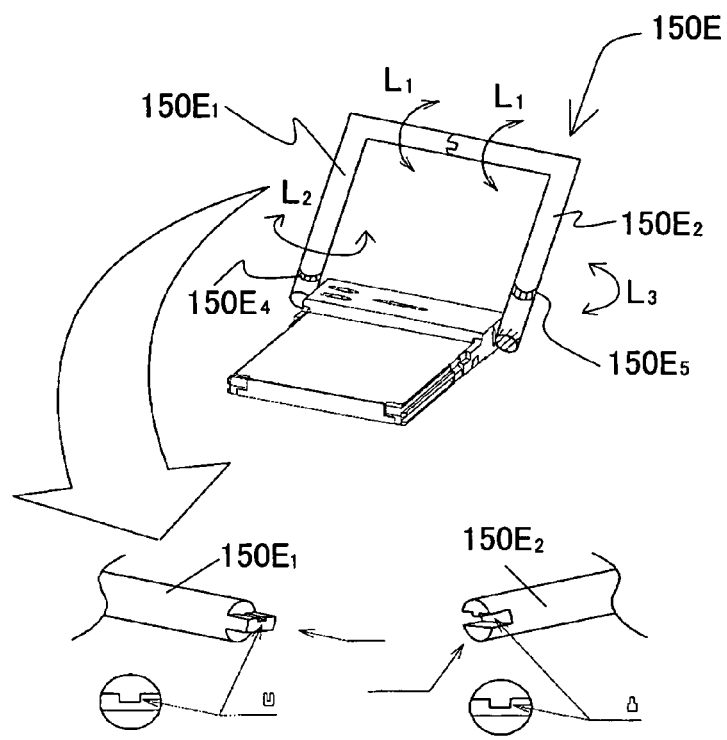
FIGS. 14A and 14B are perspective and plane views of a variation of the antenna section shown in FIG. 1.
Figure 14B:
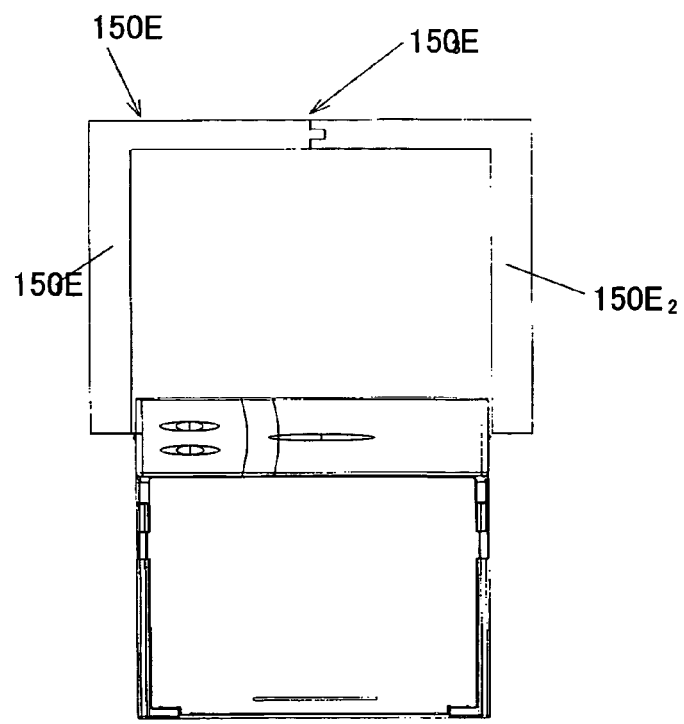
Figure 15A:
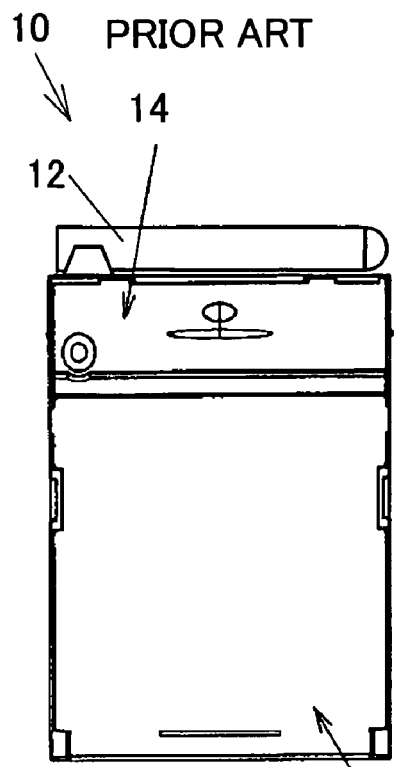
FIGS. 15A, 15B and 15C are overviews of a conventional wireless communication apparatus.
Figure 15B:
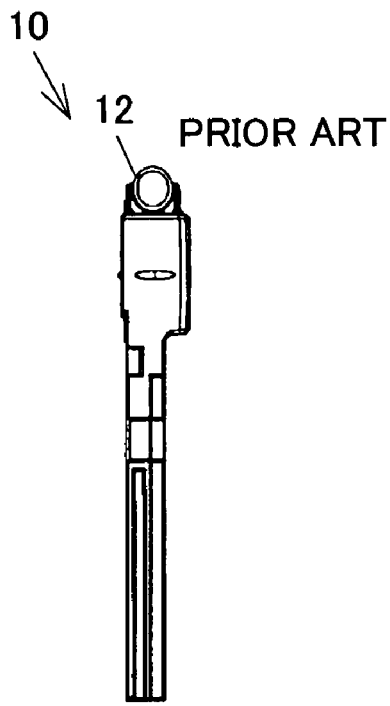
Figure 15C:
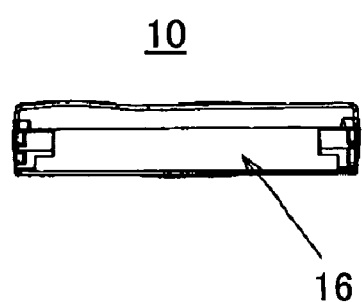
Figure 16:
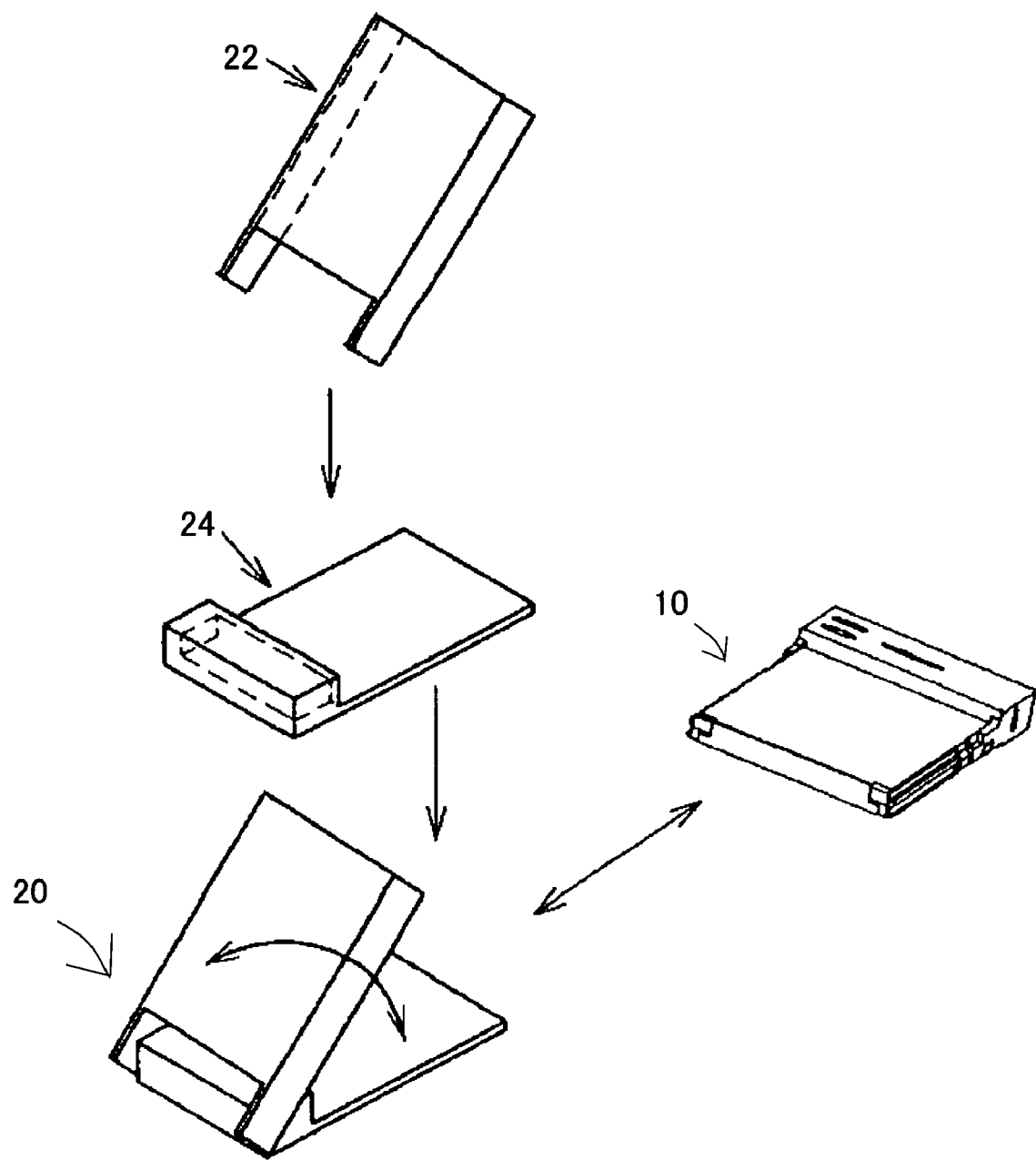
FIG. 16 is an overview of a protective cover for the conventional wireless communication apparatus.
Figure 17:
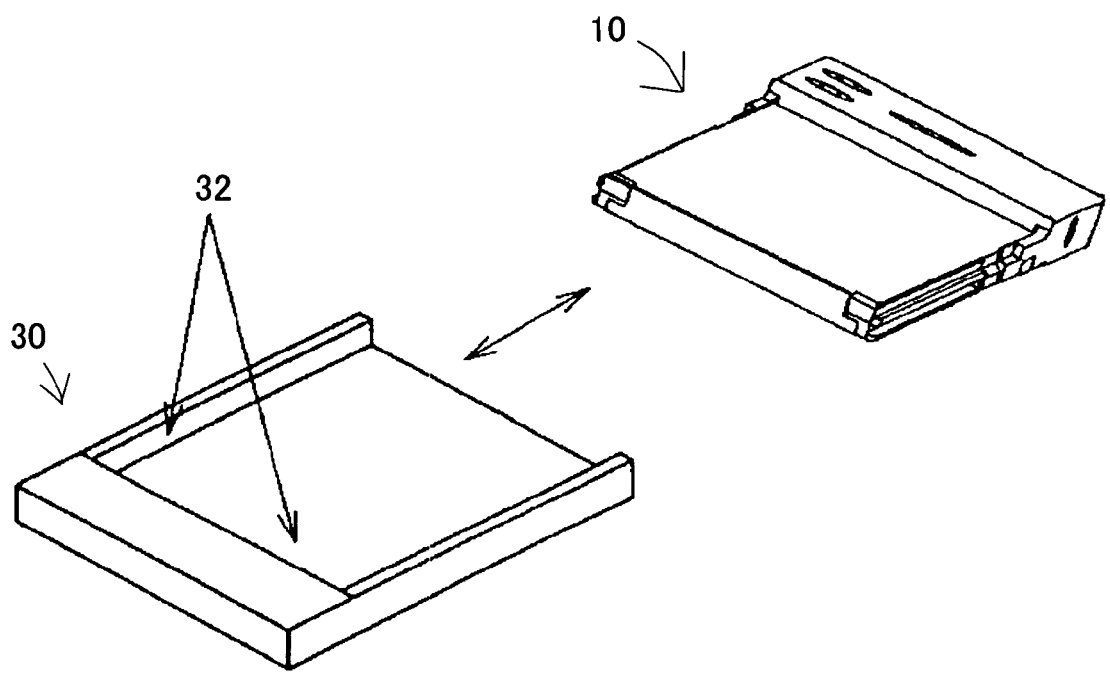
FIG. 17 is an overview of another protective cover for the conventional wireless communication apparatus.

Referring now to FIGS. 14A and 14B, a description will be given of an antenna section 150E as a variation of the antenna section 150. The antenna section 150E can be divided into a part $150E_1$ and a part $150E_2$. While this embodiment divides the antenna section 150E into two parts, the present invention does not prevent the antenna section 150E from being divided into three or more parts. FIG. 14A is a perspective view of the antenna section 150E, and FIG. 14B is a plane view of the antenna section 150E.

The parts $150E_1$ and $150E_2$ are engageable at a joint $150E_3$. FIG. 14A shows that the part $150E_1$ has a concave top and the part $150E_2$ has a convex top. The joint $150E_3$ prevents the antenna section from separating in covering the connector.

Each divided part is rotatable independent of the other part. In this embodiment, the part $150E_1$ is rotatable in directions $L_1$ and $L_2$ while the part $150E_2$ is rotatable in directions $L_1$ and $L_3$. A rotating part $150E_4$ enables the part $150E_1$ to rotate in the direction $L_2$, and a rotating part $E_5$ enables the part $150E_2$ to rotate in the direction $L_3$. The rotating part $150E_4$ may be implemented, for example, by making a rift in the antenna cover 159 to the antenna built-in portion 151. The rotating part $150E_5$ may use, for example, a hinge mechanism.

A description will now be given of the operation of the inventive wireless communication apparatus 100. When the wireless communication apparatus 100 is not used, the connector 118 is covered with the antenna cover 159 and protected from the dust. When the wireless communication apparatus 100 is used, the antenna section 150 is rotated around the rotational center RC to expose the connector 118 and enable the connector 118 to be connected to the electronic apparatus 70. After an angle of the antenna section 150 is properly adjusted, the antenna section 150 is fixed at that angular position. If the antenna section 150 is the antenna section 150D, its length is properly adjusted and then fixed. As a result, the antenna section 150 can maintain the predetermined communication performance. If necessary, as shown in FIGS. 14A and 14B, the antenna section 150E is divided and independently rotated so as to improve the directivity.

Further, the present invention is not limited to these preferred embodiments, and various modifications and changes may be made in the present invention without departing from the spirit and scope thereof. For example, while the divided part is rotatable in FIGS. 14A and 14B, the divided part may be bendable independent of the other part. Such a bending may be implemented by a proper linkage.

The present invention can thus provide a wireless communication apparatus that protects the connector from the dust relatively inexpensively.

What is claimed is:

1. A wireless communication apparatus that provides an electronic apparatus with a wireless communication capability, said wireless communication apparatus comprising:

a housing configured to be at least partially inserted into and ejected from an insertion opening of the electronic apparatus;

a connector that is provided to said housing, and includes a part configured to be electrically connected to the electronic apparatus when the housing is inserted into the insertion opening of the electronic apparatus;

an antenna section that is connected to said housing, and includes an antenna cover and an antenna housed in the antenna cover; and a mechanism configured to move the antenna section relative to the housing between a first position and a second position, wherein the antenna section located at the first position covers the part of said connector, and the antenna section located at the second position exposes the part of said connector and allows an electric connection between the part of said connector and the electronic apparatus.

2. A wireless communication apparatus according to claim 1, wherein the mechanism includes an angle adjusting mechanism that adjusts and fixes an angle of said antenna section relative to the housing.

3. A wireless communication apparatus according to claim 1, wherein the mechanism includes a slide mechanism that slides said antenna section relative to the housing.

4. A wireless communication apparatus according to claim 1, wherein the mechanism includes a length adjusting mechanism that adjusts and fixes a length of said antenna section.

5. A wireless communication apparatus according to claim 1, wherein the mechanism includes a stopper mechanism that prevents a drop of said antenna section.

6. A wireless communication apparatus according to claim 1, wherein said antenna section is dividable into plural parts.

7. A wireless communication apparatus according to claim 2, wherein said antenna section is dividable into first and second parts that are independently rotatable, and wherein said angle adjusting mechanism fixes the first and second parts at different angles.

8. A wireless communication apparatus according to claim 6, wherein said plural parts are independently rotatable in at least two directions.

9. A wireless communication apparatus according to claim 6, wherein said plural parts have a bendable end.

10. A wireless communication apparatus according to claim 6, wherein said antenna section includes an engagement portion that engages the plural parts with each other.

11. A wireless communication apparatus according to claim 1, wherein said antenna section serves as an ejector that is pulled in ejecting said housing that is inserted into the insertion opening.

12. A wireless communication apparatus according to claim 1, wherein the antenna section that covers the part of the connector is made of an elastic material.

13. A wireless communication apparatus according to claim 1, wherein a shape of the antenna cover is different from that of the antenna.

14. A wireless communication apparatus according to claim 1, wherein said antenna section has a U-shaped shape.

15. A function expanding apparatus that expands a function of an electronic apparatus, said function expanding apparatus comprising:

a housing configured to be at least partially inserted into and ejected from an insertion opening of the electronic apparatus;

a connector that is provided to said housing, and includes a part configured to be electrically connected to the electronic apparatus when the housing is inserted into the insertion opening of the electronic apparatus;
a shield that is connected to said housing; and
a mechanism configured to move the shield relative to the housing between a first position and a second position, wherein the shield located at the first position covers the part of said connector, and the shield located at the second position exposes the part of said connector and allows an electric connection between the part of said connector and the electronic apparatus.

* * * * *